Jan. 19, 1954 M. V. VIGNEAU 2,666,293
ROTARY PUMP AND MOTOR HYDRAULIC TRANSMISSION
Filed April 20, 1950
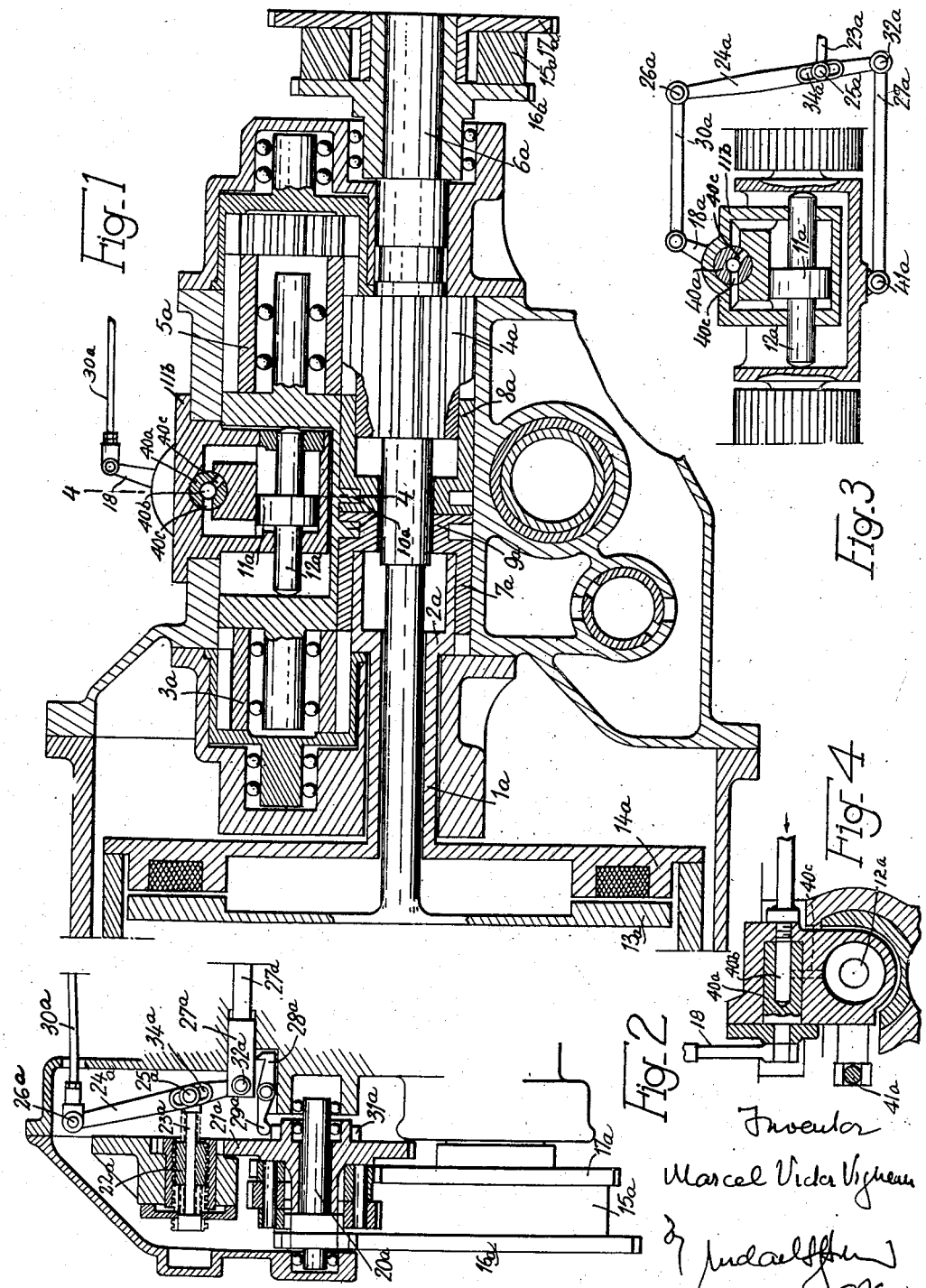

Patented Jan. 19, 1954

2,666,293

UNITED STATES PATENT OFFICE 2,666,293

ROTARY PUMP AND MOTOR HYDRAULIC TRANSMISSION

Marcel Victor Vigneau, Suresnes, France

Application April 20, 1950, Serial No. 156,956

Claims priority, application France April 21, 1949

4 Claims. (Cl. 60—53)

The present invention relates to a rotary pump and motor hydraulic transmission, and more particularly to a hydraulic transmission of the type in which a rotary pump having an effective pump chamber of variable volume and including a movable control element for increasing and decreasing the volume of the effective pump chamber drives a rotary hydraulic motor having an effective motor chamber of variable volume and a movable control element for increasing and decreasing the effective volume of the effective motor chamber.

It is the object of the present invention to provide in a hydraulic transmission of this type torque responsive automatically acting regulating means which act on the movable control elements to increase and decrease, respectively, the effective volumes of the pump and motor chambers respectively.

It is another object of the present invention to provide coupling means for coupling the pump and motor in a direct drive when the torque reaches a low level and the pump and motor rotate at substantially the same speed.

It is a further object of the present invention to provide locking means for holding the coupling means temporarily in engaged position in order to prevent frequent engagement and disengagement of the coupling means due to small torque fluctuations.

With these objects in view, the present invention consists in a hydraulic transmission comprising in combination a drive shaft, a driven shaft, a rotary pump mounted on the drive shaft and having an effective chamber of variable volume and including a movable element increasing the volume of the effective chamber when moving in one direction so as to increase the output of the pump, and reducing the volume of the effective chamber when moved in the opposite direction, a rotary hydraulic motor mounted on the driven shaft having an effective chamber of variable volume and including a movable element decreasing the volume of the effective chamber of the hydraulic motor when moved in the one direction and increasing the volume of the effective chamber of the hydraulic motor when moved in the opposite direction, reciprocable connecting means connecting the movable element of the pump with the movable element of the hydraulic motor so that movement of the connecting means in the one direction causes movement of the movable elements and an increased speed of rotation of the hydraulic motor and the driven shaft, and movement in the opposite direction causes movement of the movable elements and a decreased speed of the hydraulic motor and the driven shaft, operating means including a cylinder, a reciprocable piston mounted in the cylinder, valve means mounted on the cylinder and adapted to admit a liquid to the same for reciprocation of the piston, lever means acting on the valve means on one end and secured to the connecting means on the other end and adapted to open and close the valve means, and a link connecting the piston with the connecting means for moving the same in said direction, coupling means movable between an engaged and a disengaged position, and in engaged position connecting the drive shaft and the driven shaft for direct drive, the coupling means being operatively connected to the connecting means so as to be moved into engaged position by the same when the connecting means assumes a predetermined position, torque responsive means mounted on the driven shaft relatively movably thereto and being moved for a predetermined distance corresponding to the torque exerted on the driven shaft, actuating means connecting the torque responsive means with the lever means of the operating means so that the lever means moves the connecting means to the predetermined position in which the coupling means is moved to engaged position when the torque responsive means moves for a predetermined distance indicating a small difference between the speed of the driven shaft and the speed of the drive shaft, locking catch means movable between a locking position engaging and locking the operating means when the same moves to a position corresponding to an engaged position of the coupling means, and a releasing position releasing the operating means, and cam means engaging the locking catch means and moving the same to the releasing position when the torque exerted on the torque responsive means has risen to a second level exceeding the first predetermined level by a predetermined amount and the torque responsive means rotates the pinion through a predetermined angle whereby actuation of the operating means and movement of said coupling means by slight torque fluctuations is prevented.

The invention will be best understood from the following description of a specific embodiment when read in connection with the accompanying drawing, in which:

Fig. 1 is a sectional view of an embodiment of a hydraulic transmission according to the present invention;

Fig. 2 is a fragmentary sectional view of the torque responsive regulating mechanism;

Fig. 3 is a fragmentary sectional view of the operating means for regulating the hydraulic transmission; and Fig. 4 is a fragmentary cross sectional view on line 4—4 in Fig. 1.

Referring now to the drawing, the driving shaft $1_a$ drives a gear pump $2_a$, $3_a$, the fluid delivered by said pump being used to supply a hydraulic motor $4_a$, $5_a$, mounted on the driven shaft $6_a$.

The movable control elements of the hydraulic transmission, the pinion $3_a$ and spider $7_a$, for the pump, and pinion $5_a$ and spider $8_a$ for the motor, are connected by the connecting means $9_a$, $10_a$, imbedded in each other. The displacement of these parts $9_a$ and $10_a$, by operating means, for instance by an action on the piston $11_a$ moving in cylinder $11_b$ and slipping rod $12_a$ by any suitable means will cause the desired speed variation by an inverse variation of fluid flow between the pump and motor. Thus one may pass gradually from a zero or low speed to an increased speed.

It is preferable to produce only decreased speeds of the driven shaft and to place the driven shaft in direct drive with the driving shaft when their speeds become equal.

The coupling means, preferably a magnetic clutch $13_a$, $14_a$ is provided for this purpose.

As shown in Fig. 1 and 2, the adjustment of the speed reduction is subject to an element responsive to the torque variations on the output shaft $6_a$.

A torque responsive means such as a block of rubber or like resilient material, $15_a$, is arranged on the shaft $6_a$ for this purpose. The torsion due to the torque applied to the shaft $6_a$ causes a relative turning of the gears $16_a$ and $17_a$ which frictionally engage the rubber block $15_a$.

This relative displacement of the gears $16_a$ and $17_a$ is transmitted through suitable means to the element $18_a$ controlling the output ratio of the transmission.

Figures 2, 3 and 4 show such actuating means.

Referring to these figures, the relative displacement is transmitted to a differential gear means $20_a$, to a pinion $21_a$ and is measured by the absolute rotation of the pinion $21_a$, which is converted by the worm $22_a$ into a motion of the actuating rod $23_a$.

The lever $24_a$ is connected at $25_a$ with said rod $23_a$, at $26_a$ with the rod $30_a$, which controls at $18_a$ the valve $40_a$, and is connected at $32_a$ with the rod $27_a$ pivotally connected at $41_a$ with the connecting means of the control elements of the hydraulic transmission. For a motive power given and defined by the position of the throttle of the prime mover, a variation of the resistant torque causes a torsion variation of the block $15_a$, and consequently a well defined displacement of the rod $30_a$. This displacement actuates the valve $40_a$ and causes the admission of oil through bore $40_b$ and conduits $40_c$ in the valve $40_a$ to the chambers on one or the other face of the piston $11_a$, in such a manner that to an increase of the resistant couple there corresponds an increase of the reduction ratio; and, consequently, an increase in the speed of the driving shaft and, in correlation, in the torque on the driving shaft. The displacement of the piston $11_a$ causes the displacement of the rod $27_a$ and, consequently, an inverse motion of the rod $30_a$ which gradually closes the valve $40_a$ when the equilibrium between the motive and resistant torques has been reached. By attaching the rod $23_a$ to the lever $24_a$ by means of a pin $25_a$ which is movable in an eyelet $34_a$, it is possible to adjust the device to the best position, especially as regards the opening speed of the ports of the valve $40_a$. The arrangement shown allows the automatic maintaining of the engine in the conditions of maximum utilization of the motive power.

It is advantageous to automatically shift to direct drive when the resistant torque falls below a predetermined low level value so that the driving and driven shafts rotate at equal speeds. Any manner of means may be used to this effect, such as an electrical contact associated with the position of pinion $21_a$ and effecting engagement of the magnetic clutch $13_a$, $14_a$.

It is important, however, that the direct drive is maintained for resistant torques up to a level substantially higher than that causing direct drive coupling, otherwise the operation with low torques would cause a succession of throwings in or out of this direct drive due to slight torque fluctuations.

To this effect, there has been provided, in the example of Figure $2a$, locking catch $28_a$, resting at $29_a$ on a cam surface $31_a$ of pinion $21_a$, which keeps the rod $27_a$ in its position corresponding to direct drive, up to a predetermined level of the resistant torque and then causes its sudden release, putting the transmission into operation, and causing the establishing of a new demultiplication equilibrium meeting more exactly the value reached by the resistant torque.

Other types of embodiment may be adopted, the one shown on the appended drawing being proposed only by way of a purely illustrative example.

What is claimed is:

1. A hydraulic transmission, comprising in combination, a drive shaft; a driven shaft; a rotary pump mounted on said drive shaft and having an effective chamber of variable volume and including a movable element increasing the volume of said effective chamber when moved in one direction so as to increase the output of said pump, and reducing the volume of the effective chamber when moved in the opposite direction; a rotary hydraulic motor mounted on said driven shaft having an effective chamber of variable volume and including a movable element decreasing the volume of said effective chamber of said hydraulic motor when moved in said one direction and increasing the volume of said effective chamber of said hydraulic motor when moving in said opposite direction; reciprocable connecting means connecting said movable element of said pump with said movable element of said hydraulic motor so that movement of said connecting means in said one direction causes movement of said movable elements and an increased speed of rotation of said hydraulic motor and said driven shaft, and movement in said opposite direction causes movement of said movable elements and a decreased speed of said hydraulic motor and said driven shaft; operating means for reciprocating said connecting means; coupling means movable between an engaged and a disengaged position, and in engaged position connecting said drive shaft and said driven shaft for direct drive, said coupling means being operatively connected to said connecting means so as to be moved into engaged position by the same when said connecting means assume a predetermined position; torque responsive means including a first gear mounted on said driven shaft, a second gear relatively turnable to said first gear, and an annular rubber member located intermediate said two gears frictionally connecting the same so that said second gear turns relatively to said first gear corresponding to the torque exerted on said driven shaft; a rotatable pinion; differential gear means operatively connecting said first and second gears with said rotatable pinion so that relative turning of said second gear causes rotation of said rotatable pinion; worm gear means operatively connected to said rotatable pinion; a longitudinally movable actuating rod secured to said worm gear means at one end, and adjustably connected at the other end thereof with said operating means and moving said connecting means to said predetermined position in which said coupling means is moved to engaged position when said torque responsive means moves for a predetermined distance indicating a small difference between the speed of the driven shaft and the speed of the drive shaft; locking catch means movable between a locking position engaging and locking said operating means when the same moves to a position corresponding to an engaged position of said coupling means, and a releasing position releasing said operating means; and cam means connected to and rotating with said pinion, said cam means engaging said locking catch means and moving the same to said releasing position when the torque exerted on said torque responsive means has risen to a second level exceeding said first predetermined level by a predetermined amount and said torque responsive means rotate said pinion through a predetermined angle so as to prevent actuation of said operating means and movement of said coupling means by slight torque fluctuations is prevented.

2. A hydraulic transmission, comprising in combination, a drive shaft; a driven shaft; a rotary pump mounted on said drive shaft and having an effective chamber of variable volume and including a movable element increasing the volume of said effective chamber when moving in one direction so as to increase the output of said pump, and reducing the volume of the effective chamber when moved in the opposite direction; a rotary hydraulic motor mounted on said driven shaft having an effective chamber of variable volume and including a movable element decreasing the volume of said effective chamber of said hydraulic motor when moved in said one direction and increasing the volume of said effective chamber of said hydraulic motor when moved in said opposite direction; reciprocable connecting means connecting said movable element of said pump with said movable element of said hydraulic motor so that movement of said connecting means in said one direction causes movement of said movable elements and an increased speed of rotation of said hydraulic motor and said driven shaft, and movement in said opposite direction causes movement of said movable elements and a decreased speed of said hydraulic motor and said driven shaft; operating means including a cylinder, a reciprocable piston mounted in said cylinder, valve means mounted on said cylinder and operable to admit a liquid to the same for reciprocation of said piston, lever means acting on said valve means on one end and secured to said connecting means on the other end to open and close said valve means, and a link connecting said piston with said connecting means for moving the same in said directions; coupling means movable between an engaged and a disengaged position, and in engaged position connecting said drive shaft and said driven shaft for direct drive, said coupling means being operatively connected to said connecting means so as to be moved into engaged position by the same when said connecting means assumes a predetermined position; torque responsive means mounted on said driven shaft relatively movably thereto and being moved for a predetermined distance corresponding to the torque exerted on said driven shaft; and actuating means connecting said torque responsive means with said lever means of said operating means so that said lever means moves said connecting means to said predetermined position in which said coupling means is moved to engaged position when said torque responsive means moves for a predetermined distance indicating a small difference between the speed of the driven shaft and the speed of the drive shaft.

3. A hydraulic transmission, comprising, in combination, a drive shaft; a driven shaft; a rotary pump mounted on said drive shaft and having an effective chamber of variable volume and including a movable element increasing the volume of said effective chamber when moved in one direction so as to increase the output of said pump, and reducing the volume of the effective chamber when moved in the opposite direction; a rotary hydraulic motor mounted on said driven shaft having an effective chamber of variable volume and including a movable element decreasing the volume of said effective chamber of said hydraulic motor when moved in said one direction and increasing the volume of said effective chamber of said hydraulic motor when moving in said opposite direction; reciprocable connecting means connecting said movable element of said pump with said movable element of said hydraulic motor so that movement of said connecting means in said one direction causes movement of said movable elements and an increased speed of rotation of said hydraulic motor and said driven shaft, and movement in said opposite direction causes movement of said movable elements and a decreased speed of said hydraulic motor; operating means including a cylinder, a reciprocable piston mounted in said cylinder, valve means mounted on said cylinder and operable to admit a liquid to the same for reciprocation of said piston, lever means acting on said valve means on one end and secured to said connecting means on the other end to open and close said valve means, and a rod secured to said piston and engaging said connecting means for moving the same in said directions; coupling means movable between an engaged and a disengaged position, and in engaged position connecting said drive shaft and said driven shaft for direct drive, said coupling means being operatively connected to said connecting means so as to be moved into engaged position by the same when said connecting means assumes a predetermined position; torque responsive means including a first gear mounted on said driven shaft, a second gear relatively turnable to said first gear, and an annular rubber member located intermediate said two gears frictionally connecting the same so that said second gear is turned relatively to said first gear corresponding to the torque exerted on said driven shaft; a rotatable pinion; differential gear means operatively connecting said first and second gears with said rotatable pinion so that relative turning of said second gear causes rotation of said rotatable pinion; worm gear means operatively connected to said rotatable pinion; a longitudinally movable actuating rod secured to said worm gear means at one end, and adjustably connected at the other end thereof with said lever means of said operating means and moving said connecting means to said predetermined position in which said coupling means is moved to engaged position when said torque responsive means moves for a predetermined distance indicating a small difference between the speed of the driven shaft and the speed of the drive shaft; locking catch means movable between locking position engaging and locking said operating means when the same moves to a position corresponding to an engaged position of said coupling means, and a releasing position releasing said operating means; and cam means connected to and rotating with said pinion, said cam means engaging said locking catch means and moving the same to said releasing position when the torque exerted on said torque responsive means has risen to a second level exceeding said first predetermined level by a predetermined amount and said torque responsive means rotate said pinion through a predetermined angle so as to prevent actuation of said operating means and movement of said coupling means by slight torque fluctuations is prevented.

4. A hydraulic transmission, comprising in combination, a drive shaft; a driven shaft; a rotary pump mounted on said drive shaft and having an effective chamber of variable volume and including a movable element increasing the volume of said effective chamber when moving in one direction so as to increase the output of said pump, and reducing the volume of the effective chamber when moved in the opposite direction; a rotary hydraulic motor mounted on said driven shaft having an effective chamber of variable volume and including a movable element decreasing the volume of said effective chamber of said hydraulic motor when moved in said one direction and increasing the volume of said effective chamber of said hydraulic motor when moved in said opposite direction; reciprocable connecting means connecting said movable element of said pump with said movable element of said hydraulic motor so that movement of said connecting means in said one direction causes movement of said movable elements and an increased speed of rotation of said hydraulic motor and said driven shaft, and movement in said opposite direction causes movement of said movable elements and a decreased speed of said hydraulic motor and said driven shaft; operating means including a cylinder, a reciprocable piston mounted in said cylinder, valve means mounted on said cylinder and adapted to admit a liquid to the same for reciprocation of said piston, lever means acting on said valve means on one end and secured to said connecting means on the other end and adapted to open and close said valve means, and a link connecting said piston with said connecting means for moving the same in said direction; coupling means movable between an engaged and a disengaged position, and in engaged position connecting said drive shaft and said driven shaft for direct drive, said coupling means being operatively connected to said connecting means so as to be moved into engaged position by the same when said connecting means assumes a predetermined position; torque responsive means mounted on said driven shaft relatively movably thereto and being moved for a predetermined distance corresponding to the torque exerted on said driven shaft; actuating means connecting said torque responsive means with said lever means of said operating means so that said lever means moves said connecting means to said predetermined position in which said coupling means is moved to engaged position when said torque responsive means moves for a predetermined distance indicating a small difference between the speed of the driven shaft and the speed of the drive shaft; locking catch means movable between a locking position engaging and locking said operating means when the same moves to a position corresponding to an engaged position of said coupling means, and a releasing position releasing said operating means; and cam means connected to and rotating with said pinion, said cam means engaging said locking catch means and moving the same to said releasing position when the torque exerted on said torque responsive means has risen to a second level exceeding said first predetermined level by a predetermined amount and said torque responsive means rotates said pinion through a predetermined angle whereby actuation of said operating means and movement of said coupling means by slight torque fluctuations is prevented.

MARCEL VICTOR VIGNEAU.

References Cited in the file of this patent

UNITED STATES PATENTS

| Number | Name | Date |
|---|---|---|
| 1,017,355 | White | Feb. 13, 1912 |
| 1,235,817 | Lape | Aug. 7, 1917 |
| 1,742,215 | Pigott | Jan. 7, 1930 |
| 1,789,785 | Steiner | Jan. 20, 1931 |
| 2,199,081 | Perin | Apr. 30, 1940 |
| 2,275,321 | Scates | Mar. 3, 1942 |
| 2,323,926 | McGill | July 13, 1943 |
| 2,359,423 | Johnson | Oct. 3, 1944 |

FOREIGN PATENTS

| Number | Country | Date |
|---|---|---|
| 281,107 | Great Britain | Dec. 1, 1927 |